Dec. 9, 1941.   L. E. KREBS   2,265,292
METHOD AND APPARATUS FOR TESTING TELEPHONE TRANSMITTERS
Filed June 18, 1938

INVENTOR
L. E. KREBS
BY
ATTORNEY

Patented Dec. 9, 1941

2,265,292

UNITED STATES PATENT OFFICE 2,265,292

METHOD AND APPARATUS FOR TESTING TELEPHONE TRANSMITTERS

Luther E. Krebs, West Orange, N. J., assignor to Bell Telephone Laboratories, Incorporated, New York, N. Y., a corporation of New York Application June 18, 1938, Serial No. 214,442

13 Claims. (Cl. 179—175.1)

This invention relates to a method and apparatus for testing telephone subscribers' transmitters at the subscriber's station.

Heretofore various devices have been made to test receivers both as laboratory and manufacturing test apparatus and as a means of testing subscribers' receivers without removing them from the subscriber's station. Patents disclosing the former type are represented by the patent to R. R. Herrman 1,412,405, granted April 11, 1922, and the patent to H. D. Arnold et al. 1,426,807, granted August 22, 1922, neither of which are adaptable to convenient, portable and relatively inexpensive field use as is obvious from the disclosures made. Patents disclosing the latter type are represented by F. H. Best, 1,414,397, granted May 2, 1922, H. Fletcher, 1,469,271, granted October 2, 1923, and H. Fletcher, 1,522,294, granted January 6, 1925. These latter patents disclose means of testing at the subscriber's station with apparatus located at the central office test board. However, it has been found advisable from experience to make this test with a standardized sound source located at the subscriber's station rather than attempting to transmit it from the test board.

It is accordingly the object of this invention to provide a portable means and method of test for testing subscribers' station transmitters without removing them from their stations.

This invention attains the foregoing object by providing a method and apparatus comprising a means for generating a composite sound frequency spectrum of predetermined band width and of substantially uniform amplitude, means for impressing this sound frequency upon the transmitter to be tested and a measuring means adapted to measure the composite response of the transmitter.

In the accompanying drawing,

Fig. 1 diagrammatically discloses one complete form of the invention;

Figure 3:
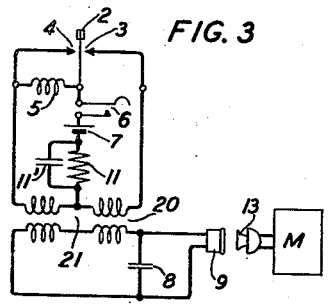
Figure 4:
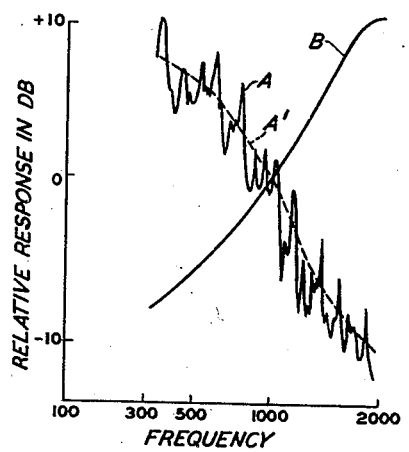
Figure 5:
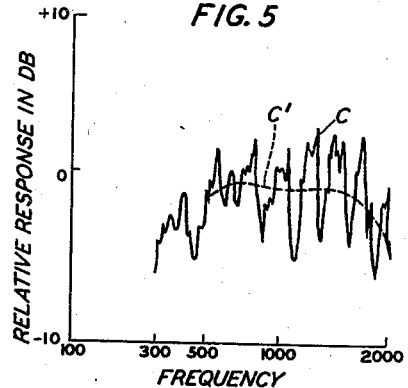

Fig. 3 discloses another form of the invention also adapted for "push-pull" operation;

Fig. 4 represents typical voltage and acoustic characteristics of the composite electric frequency generator and the electro-acoustical transducer, respectively; and Fig. 5 shows a typical over-all acoustic output characteristic of the complete combination.

Figure 1:
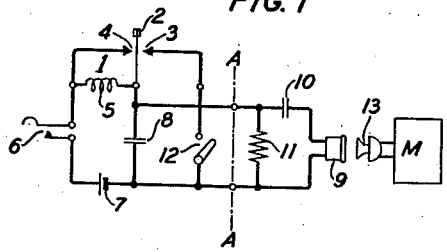
Fig. 1a represents a modified method of connecting the electro-acoustical transducer to the composite electric frequency generator of Fig. 1.

Referring now to Fig. 1, the composite electric frequency generator is shown in the form of an electromechanical vibrator generally designated by reference numeral 1 and comprises a low frequency vibrating reed 2 driven by an associated electromagnet 5 by current from battery 7. Upon operating the momentary push-button 6 current from battery 7 flows through coil 5 and back to battery 7 via resistor 11. Reed 2 is thereby attracted to contact 4 whereupon coil 5 is short-circuited and the magnetism therein rapidly reduces permitting reed 2 to break away from contact 4 and swing over to contact 3. If switch 12 is closed the contact momentarily established between reed 2 and contact 3 short-circuits resistor 11 to rapidly bring the voltage thereacross to zero. Reed 2 continues to vibrate as long as push-button 6 is pressed and continues to intermittently switch voltages across resistor 11 through the following cycle: First the full voltage of battery 7, then the voltage of battery 7 less the impedance drop across coil 5, then zero voltage and finally the battery voltage less the impedance drop in coil 5. Of course, the voltage at any instant across resistor 11 obeys the laws deduced for transient phenomena and is in a continuous state of change, as is well understood. Moreover, it is known that with the circuit elements employed the final voltage wave impressed upon resistor 11 is rich in harmonics of the reed frequency. A typical voltage characteristic obtained from such an electric frequency generator may be represented as curve A of Fig. 4 where dotted curve A' represents the approximate mean output characteristic plotted against frequency. The curve is controllably accentuated for lower frequencies and drooped for higher frequencies by means of condenser 8 shunting resistor 11, the purpose for which will hereinafter be more clearly disclosed. As is usually the case, although not necessarily so, the generator characteristic alone is not normally of the proper shape and, therefore, requires the appropriate shunting condenser such as condenser 8. It is obvious that although a simple vibrating switching means is specifically described, yet many other switching means could be used, for example a rotating commutator type switch driven at constant speed.

In order to convert the composite electric frequency thus generated into appropriate acoustic energy, an electro-acoustical transducer 9, preferably in the form of a telephone receiver, is connected across resistor 11 through a coupling condenser 10. Condenser 10 effectively blocks the passage of any direct current component through receiver 9. This transducer is so designed as to have the radiation characteristic denoted B as shown in Fig. 4. It will be noted that the electric frequency generator characteristic and the transducer radiation characteristic are made substantial complements of each other and when combined will produce a substantially uniform output similar to that shown in Fig. 5, which represents a satisfactory matched system between 500 and 2000 cycles. This frequency band may be varied to suit the peak characteristic of the various transmitters to be tested and it is to be understood that the limits herein given are illustrative only. The only requirement is that the over-all acoustic output frequency characteristic should be substantially constant throughout the selected band. It is also to be observed that these output frequencies which are harmonics of the reed frequency are simultaneously produced thereby resulting in a composite frequency spectrum which is desirable to obtain a sufficiently steady and precise transmitter response reading.

Figure 2:
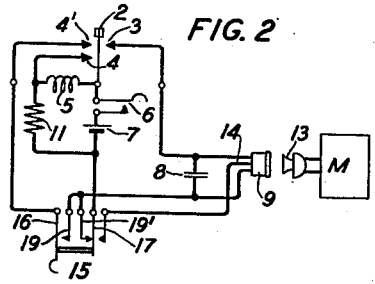
Fig. 2 represents another complete form of the invention adapted for either "push-pull" or simple "series" operation.

The acoustic sound spectrum from transducer 9 is acoustically coupled to the subscriber's transmitter 13 by spacing therefrom a predetermined gauged distance as indicated in Figs. 1, 2 and 3. A suitable volume indicating meter M is connected to the transmitter and is adapted to indicate the transmitter response to the standard composite sound source. This meter may be any of several well-known types and is preferably located at the central office test board though not necessarily so.

Figure 1A:
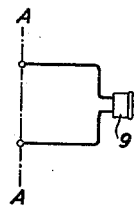

Instead of reducing to zero the voltage across resistor 11 during part of each cycle substantially the same final result will be produced by opening switch 12, thereby causing reed 2 to intermittently switch battery 7 first directly across resistor 11 and then in series with coil 5. Also transducer 9 may be directly connected across condenser 8 by disconnecting at line A—A and substituting therefor the circuit of Fig. 1A. The vibrator coil 5 now receives its current through transducer 9. In this case a direct current component appears in transducer 9 but the final result is again substantially the same.

The device of Fig. 2 is adapted for either "push-pull" or simple "series" operation depending upon whether or not a center connection between the two transducer coils (preferably of the telephone receiver type) is used. In this circuit an additional contact 4' is provided for the vibrator system. Resistor 11 is here employed only in the local vibrator circuit for driving purposes. With double pole switch 15 in the position indicated transducer 9 and its shunting condenser 8 intermittently receives full battery voltage each time reed 2 engages contact 3. This form of operation is termed simple "series" with both transducer coils acting simultaneously and in series.

With switch 15 operated so contact 17 thereof disconnects from contact 19' and connects center tap 14 to one pole of battery 7, and contact 16 thereof connects contact 4' of the vibrator to transducer 9 through contact 19, the transducer operates in "push-pull." For transducers of the telephone receiver type the explanation is that as reed 2 vibrates it alternately connects the free pole of battery 7 first to one coil of the receiver and then to the other. Since receivers of the telephone type commonly employ a biasing magnet the current while in one coil aids the magnet whereas the current while in the other coil opposes the magnet. The "push-pull" effect is thereby realized. The final effect is in either case substantially the same as that produced by the device of Fig. 1.

Fig. 3 shows another form of "push-pull" arrangement employing a push-pull transformer 20 having the usual center tapped primary winding 21. Battery 7 and resistor 11 is inserted in direct circuit with vibrator blade 2 and push-pull switch 6. Condenser 11' provides a means for by-passing the transient impulse currents around resistor 11, thereby permitting a higher resistance value and a reduced battery drain. The circuit, however, will function without it but less efficiently. From the description given in connection with Figs. 1 and 2 the operation of this form is obvious.

While the disclosures herein made are in diagrammatic form, it is obvious that the sound generating apparatus thereby represented is adaptable to exceedingly compact arrangement. It is intended that all the sound source apparatus be assembled in a convenient portable manner. For example, the battery 7 is preferably of the kind commonly employed with deaf sets, vibrator 1 similar to those employed in B eliminators, and the transducer is preferably a small but accurately made telephone receiver.

It is apparent to any one skilled in the art that various subcombinations may be made from the above described circuits and it is not intended that this invention should be limited to the specific examples above illustrated.

What is claimed is:

1. The method of testing a telephone transmitter comprising impressing upon this transmitter a composite sound frequency spectrum of predetermined band width and of substantially uniform amplitude and measuring the composite response of said transmitter.

2. The method of testing a telephone transmitter comprising generating a composite sound frequency spectrum of predetermined band width and of substantially uniform amplitude, impressing said spectrum upon said transmitter and measuring the composite response thereof.

3. A device for testing a telephone transmitter comprising means for generating a composite sound frequency spectrum of predetermined band width and of substantially uniform amplitude, means for impressing said spectrum upon said transmitter, and measuring means adapted to measure the composite response thereof.

4. A device for testing a telephone transmitter comprising means for generating a composite electric frequency spectrum, an electro-acoustical transducer responsive thereto and adapted to cooperate therewith to produce a sound frequency spectrum of predetermined band width and of substantially uniform amplitude, means for impressing said sound spectrum upon said transmitter and measuring means adapted to measure the composite response thereof.

5. A device for testing a telephone transmitter comprising electromechanical means for generating a composite electric frequency spectrum, an electro-acoustical transducer responsive thereto and adapted to cooperate therewith to produce a sound frequency spectrum of predetermined band width and of substantially uniform amplitude, means for impressing said sound spectrum upon said transmitter, and measuring means adapted to measure the composite response thereof.

6. A device for testing a telephone transmitter comprising in combination an electromechanical switching means and an electro-acoustical means adapted to cooperate and produce a composite sound frequency spectrum of predetermined band width and of substantially uniform amplitude, means for impressing said spectrum upon said transmitter, and measuring means adapted to measure the composite response thereof.

7. A device for testing a telephone transmitter comprising a source of electric current, a switching means adapted to intermittently switch said current into an electric network including as a part thereof an electro-acoustical transducer, said transducer cooperating with said switching means to produce a composite sound frequency spectrum of a predetermined band width and of substantially uniform amplitude, means for impressing said spectrum upon said transmitter, and measuring means adapted to measure the composite response thereof.

8. A device for producing a sound source for testing telephone transmitters comprising a source of electric current, an electromechanical switching means adapted to intermittently switch said current into a network comprising a parallel connected capacitor and resistor, and an electro-acoustical transducer connected across said resistor through a series-connected coupling capacitor.

9. A device for producing a sound source for testing telephone transmitters comprising a source of electric current, an electromechanical switching means adapted to intermittently switch said current into a network comprising a capacitor conductively connected in parallel with an electro-acoustical transducer.

10. A device for producing a sound source for testing telephone transmitters comprising a source of electric current, an electromechanical switching means adapted to intermittently switch said current into a network comprising an electro-acoustical transducer having two outer terminals and a center tap issuing from the electrical mid-point of the winding thereof whereby said transducer is adapted for push-pull operation.

11. A device for producing a sound source for testing telephone transmitters comprising a source of electric current, an electromechanical switching means adapted to intermittently switch said current into a network comprising an electro-acoustical transducer having two outer terminals and a center tap issuing from the electrical mid-point of the winding thereof whereby said transducer is adapted for push-pull operation and a capacitor shunting said two outer terminals.

12. A device for producing a sound source for testing telephone transmitters comprising a source of electric current, an electromechanical switching means adapted to intermittently switch said current into a network comprising the primary of a push-pull transformer having a center tap, said center tap having interposed in series therewith a parallel connected resistor and capacitor and the secondary terminals of said transformer connected to an electro-acoustical transducer in parallel with another capacitor.

13. A device for producing a sound source for testing telephone transmitters comprising a source of electric current, an electromechanical switching means adapted to intermittently switch said current into a network comprising the primary of a push-pull transformer having a center tap, said center tap having interposed in series therewith a resistor and the secondary terminals of said transformer connected to an electro-acoustical transducer in parallel with a capacitor.

LUTHER E. KREBS.